United States Patent
Paik

(10) Patent No.: US 7,885,462 B2
(45) Date of Patent: Feb. 8, 2011

(54) IMAGE PROCESSING METHOD AND SYSTEM USING GAIN CONTROLLABLE CLIPPED HISTOGRAM EQUALIZATION

(75) Inventor: Joon-Ki Paik, Seoul (KR)

(73) Assignees: Samsung Electronics Co. Ltd., Suwon-Si (KR); Chung-Ang University Industry Academic Cooperation Foundation, Seoul (KR)

( * ) Notice: Subject to any disclaimer, the term of this patent is extended or adjusted under 35 U.S.C. 154(b) by 1113 days.

(21) Appl. No.: 11/562,535

(22) Filed: Nov. 22, 2006

(65) Prior Publication Data

US 2007/0165947 A1    Jul. 19, 2007

(30) Foreign Application Priority Data

Jan. 16, 2006    (KR) .................... 10-2006-0004606

(51) Int. Cl.
- G06K 9/00    (2006.01)
- G06K 9/40    (2006.01)
- G06K 9/38    (2006.01)
- H04N 1/40    (2006.01)

(52) U.S. Cl. ................. 382/168; 382/254; 382/270; 382/274; 358/443

(58) Field of Classification Search .......... 382/168, 382/169, 274

See application file for complete search history.

(56) References Cited

U.S. PATENT DOCUMENTS

| | | | | |
|---|---|---|---|---|
| 5,239,378 A | * | 8/1993 | Tsuji et al. | 348/625 |
| 5,799,106 A | * | 8/1998 | Mooney et al. | 382/172 |
| 5,808,697 A | | 9/1998 | Fujimura et al. | |
| 5,963,665 A | * | 10/1999 | Kim et al. | 382/169 |
| 6,504,954 B1 | * | 1/2003 | Goldstein | 382/168 |
| 6,643,398 B2 | * | 11/2003 | Moriwaki | 382/167 |
| 6,714,670 B1 | * | 3/2004 | Goldsworthy et al. | 382/149 |
| 6,771,814 B1 | * | 8/2004 | Nakajima | 382/168 |
| 6,819,794 B2 | * | 11/2004 | Inoue | 382/169 |
| 7,113,648 B1 | * | 9/2006 | Aihara | 382/274 |
| 7,359,573 B2 | * | 4/2008 | Park et al. | 382/274 |
| 7,613,338 B2 | * | 11/2009 | Yano | 382/162 |
| 2003/0021478 A1 | * | 1/2003 | Yoshida | 382/195 |
| 2005/0013503 A1 | * | 1/2005 | Park et al. | 382/254 |
| 2007/0165282 A1 | * | 7/2007 | Sambongi et al. | 358/3.21 |

FOREIGN PATENT DOCUMENTS

| | | |
|---|---|---|
| JP | 9-65252 | 3/1997 |
| JP | 2002-232728 | 8/2002 |
| KR | 1020000050571 | 8/2000 |
| KR | 10-2005-0085140 | 8/2005 |

* cited by examiner

*Primary Examiner*—Bhavesh M Mehta
*Assistant Examiner*—Jose M Torres
(74) *Attorney, Agent, or Firm*—F. Chau & Associates, LLC

(57) ABSTRACT

An image processing method and system using gain-controllable clipped histogram equalization, in which the image processing method includes the steps of as obtaining a brightness histogram, computing a mean brightness of an image signal, determining a clipping rate based on the mean brightness, determining a clipping threshold based on the clipping rate, obtaining a clipped brightness histogram by clipping frequencies exceeding the clipping threshold in the brightness histogram, obtaining a corrected brightness histogram by correcting the clipped brightness as histogram using the clipping rate as a total gain, obtaining a cumulative histogram from the corrected brightness histogram, and correcting an input image using the cumulative histogram as a transformation function. Accordingly, the clipping rate is adaptively controlled so that image contrast is enhanced.

8 Claims, 8 Drawing Sheets

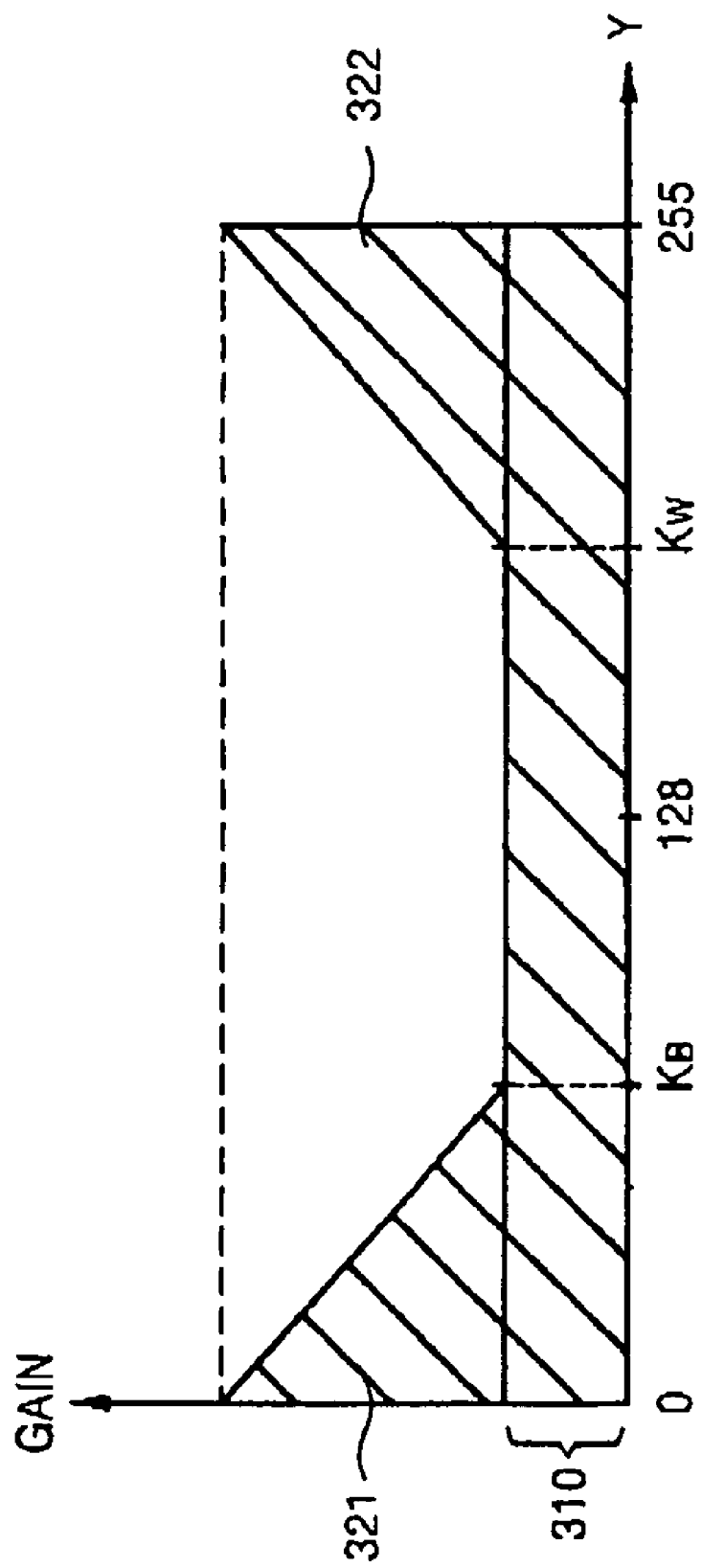

IMAGE PROCESSING METHOD AND SYSTEM USING GAIN CONTROLLABLE CLIPPED HISTOGRAM EQUALIZATION

CROSS-REFERENCE TO RELATED PATENT APPLICATION

This application claims the priority of Korean Patent Application No. 10-2006-0004606, filed on Jan. 16, 2006, in the Korean Intellectual Property Office, the disclosure of which is incorporated herein in its entirety by reference,

BACKGROUND OF THE INVENTION

1. Technical Field

The present disclosure relates to an image processing method, and more particularly, to an image processing method and system using gain-controllable clipped histogram equalization (GCCHE) to enhance image contrast.

2. Discussion of the Related Art

An original image generated in an imaging system, for example, in a digital camera or a camcorder, may not have clear or well defined contrast. When the contrast is not clear, the sharpness of the image decreases. Accordingly, to increase image sharpness, many developments for enhancing contrast have been made.

Histogram equalization (HE) is one of the most widely used methods of enhancing contrast effectively and simply. To distinguish basic HE from other modified methods, the basic HE is referred to as standard HE (SHE). SHE is based on a technique of regenerating a brightness histogram having uniform distribution and is widely used to process images like medical images and infrared images.

However, SHE may substantially change the brightness of an input image and increase undesirable noise and, therefore, special facts should be additionally considered when SHE is used in products like TV receivers and camcorders. In other words, to use SHE in practical products, a technique for increasing contrast while maintaining mean brightness is required. Such techniques may be divided into methods using histogram processing and methods using a spatio-temporal filter. The methods using histogram processing include bi-histogram equalization (BHE), recursive mean-separate histogram equalization (RMSHE), and clipped histogram equalization (CHE).

A BHE algorithm is provided to overcome a problem of SHE in which image brightness considerably changes. In the BHE algorithm, a histogram is segmented into two regions and HE is separately performed on each of the two regions. However, since HE is separately performed on the two divided regions, it may be difficult to increase contrast with respect to objects and backgrounds. To overcome this problem, an RMSHE algorithm is used. The RMSHE algorithm is an expansion of the BHE algorithm. In the RMSHE algorithm, four histograms are generated using a mean brightness value. However, the amount of computation and complexity also increases when the number of repetitions increases, and therefore, it is necessary to control the number of repetitions. Since the above-described methods use segmentation, they are is not effective to improve images in terms of noise or contrast. In other words, noise and contrast should be considered based on information on pixels distributed in an image not the distribution of a histogram, and CHE is a representative method.

In a CHE algorithm, a maximum value is set for a brightness histogram, an upper part of the histogram exceeding the maximum value is clipped, and a clipped region is reset with respect to an entire region, thereby limiting the maximum value of the histogram. Since CHE does not actually clip a histogram but is used only in computation, it does not destroy information in an image. However, it is usual that the conventional CHE algorithm has a fixed threshold and, therefore, it is difficult to adaptively control a clipped region according to the brightness of an image. Accordingly, image characteristics cannot be considered, resulting in bad effects in some images. Moreover, even though the CHE algorithm is robust to noise because a clipped histogram region is reset with respect to an entire histogram region, noise may increase in a part, such as a black level region, of an image.

SUMMARY OF THE INVENTION

Exemplary embodiments of the present invention provide an image processing method and system using clipped histogram equalization (CHE), in which a histogram clipping rate is adaptively controlled, thereby enhancing image contrast.

Exemplary embodiments of the present invention also provide an image processing method and system, in which the gain of a clipped histogram is distributed differently in different regions, thereby enhancing image contrast.

According to an exemplary embodiment of the present invention, there is provided an image processing method including obtaining a brightness histogram, computing a mean brightness of an image signal, determining a clipping rate based on the mean brightness, determining a clipping threshold based on the clipping rate, obtaining a clipped brightness histogram by clipping frequencies exceeding the clipping threshold in the brightness histogram, obtaining a corrected brightness histogram by correcting the clipped brightness histogram using the clipping rate as a total gain, is obtaining a cumulative histogram from the corrected brightness histogram, and correcting an input image using the cumulative histogram as a transformation function.

According to an exemplary embodiment of the present invention, there is provided an image processing method including obtaining an original brightness histogram of an input image, determining a clipping rate and a clipping threshold with respect to the original brightness histogram, obtaining a clipped brightness histogram by clipping frequencies exceeding the clipping threshold in the original brightness histogram, determining a global gain and a local gain based on the clipping rate, obtaining a corrected brightness histogram by correcting the clipped brightness histogram using the global gain and the local gain, and correcting the input image based on the corrected brightness histogram.

According to an exemplary embodiment of the present invention, there is provided an imaging system including an input image receiver, and a processor correcting the input image and outputting a corrected image. The processor performs the image processing method.

BRIEF DESCRIPTION OF THE DRAWINGS

Exemplary embodiments of the present invention can be understood in more detail from the following descriptions taken in conjunction with the attached drawings in which:

FIGS. 3A and 3B are graphs illustrating a global gain and a local gain in an exemplary embodiment of the present invention;

DETAILED DESCRIPTION OF EXEMPLARY EMBODIMENTS

Figure 1:
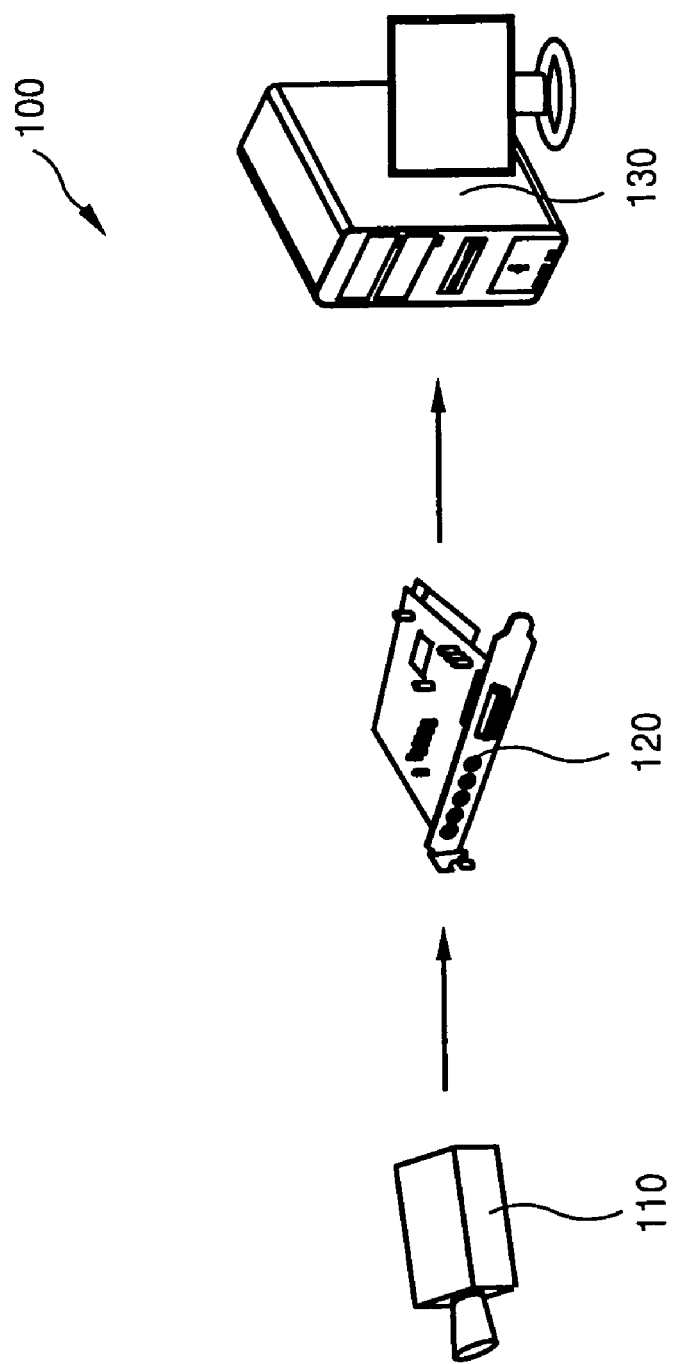
FIG. 1 is a schematic diagram of the structure of an image processing system according to an exemplary embodiment of the present invention.

Hereinafter, the present invention will be described in detail by explaining exemplary embodiments of the invention with reference to the attached drawings. Like reference numerals in the drawings denote like elements.

Figure 2:
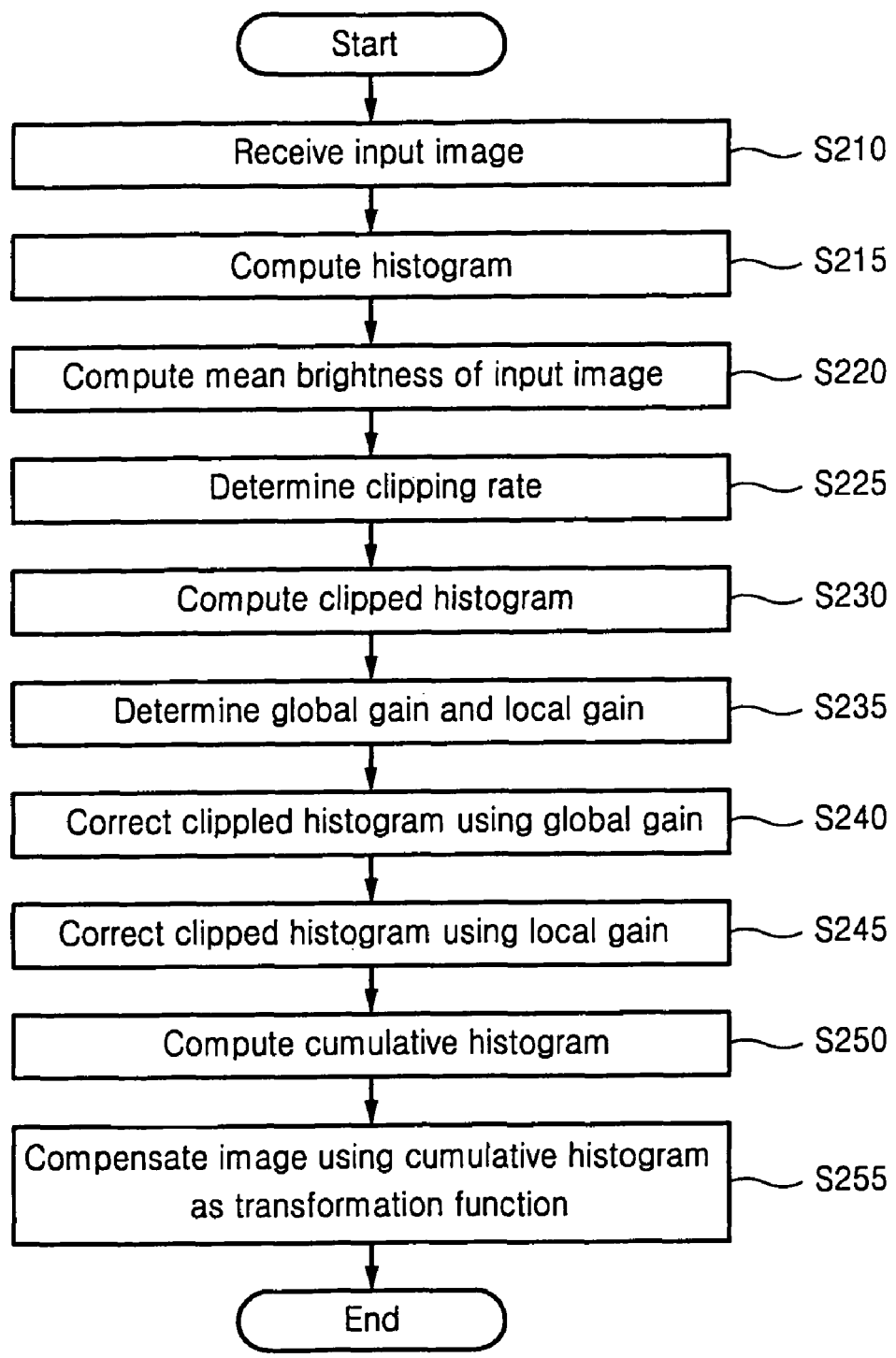
FIG. 2 is a flowchart of an image processing method according to an exemplary embodiment of the present invention.

FIG. 1 is a schematic diagram of the structure of an image processing system 100 according to an exemplary embodiment of the present invention. FIG. 2 is a flowchart of an image processing method according to an exemplary embodiment of the present invention.

Referring to FIG. 1, the image processing system 100 includes a camera 110, a frame grabber 120, and a personal computer (PC) 130. An image taken by the camera 110 is input to the PC 130 via the frame grabber 120. The frame grabber 120 divides an Image Into frames, converts each frame of the image into a digital signal, and transmits the digital signal to the PC 130. An image processing method according to an exemplary embodiment of the present invention may be performed by a software program implemented in the PC 130. In other words, the image processing method according to the exemplary embodiment of the present invention may be embodied as software and performed in a PC or server. In addition, exemplary embodiments of the present invention can be embodied in the form of software and/or hardware in systems, such as cameras, image communication systems, camera phones, and medical instruments, which process and display images.

Furthermore, the image processing method according to the exemplary embodiment of the present invention may support an interface function so that a user can control a gain clipping rate and a local gain with respect to a histogram. For example, when the image processing method according to the exemplary embodiment of the present invention is embodied in the form of computer software, it is preferable to support the control of a gain clipping rate, a local gain, and a parameter via a graphical user interface (GUI).

The image processing method according to the exemplary embodiment of the present invention will be described below in detail with reference to FIG. 2, In operation S210, an input image is received In operation S215, a brightness histogram is obtained by computation. Here, when the input image is a still image, a full image is input at one time. When the input image is a moving image, it is input in frame units. In the brightness histogram, an x-axis indicates brightness, that is, a gray level, and a y-axis indicates the frequency, that is, the number of pixels, of each gray level or a normalized frequency.

The brightness histogram may be obtained using Equation (1):

$$pdf[k] = \frac{1}{MN} \|\{i, j\} \mid f(i, j) = k\|  \quad (1)$$

where "k" is a gray level, "i" and "j" are variables indicating pixels, and MN is the total number of pixels in a frame image. When brightness has 256 gray levels, "k" is an integer of 0 through 255.

According to Equation (1), the number of pixels having a brightness of "k" is obtained and is divided by the total number of pixels in each frame, so that a normalized frequency is obtained with respect to the brightness. Accordingly, the number of pixels corresponding to each gray level is measured to obtain a normalized brightness histogram.

Figure 4A:
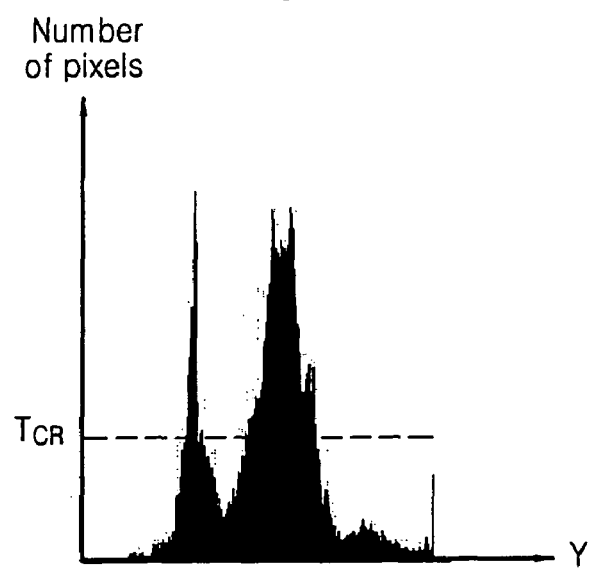
FIGS. 4A through 4C are graphs of a histogram, a clipped histogram, and a corrected histogram, respectively, of an original image.

An example of the brightness histogram is illustrated in FIG. 4A. In the brightness histogram illustrated in FIG. 4A, the x-axis indicates a brightness Y and the y-axis indicates a number of pixels (here, a normalized frequency).

After the brightness histogram is obtained, in operation S220 a mean brightness $B_{cr}$ of the input image is computed. The mean brightness $B_{cr}$ may be obtained by adding all pixels' gray levels in a frame and dividing the result of the addition by the total number of pixels in the frame Alternatively, the mean brightness $B_{cr}$ may be obtained by obtaining a cumulative brightness histogram (which may be referred to as a cumulative histogram) "cdf" from the brightness histogram "pdf" obtained using Equation (1) and taking a brightness corresponding to a normalized cumulative frequency of 0.5 in the cumulative histogram "cdf".

The cumulative histogram "cdf" can be obtained using Equation (2):

$$cdf[k] = \sum_{t=1}^{k} pdf[t]  \quad (2)$$

As is seen from Equation (2), the cumulative histogram "cdf" is an integral value of the brightness histogram "pdf". The mean brightness $B_{cr}$ can be obtained from Equation (3) using the cumulative histogram for "cdf" from equation (2):

$$B_{cr} = \{k, \text{ if } cdf[k] = 0.5\}.  \quad (3)$$

As is seen from Equation (3), the brightness "k" corresponding to a point of 50% in the distribution of the cumulative histogram "cdf", that is, a normalized cumulative frequency of 0.5, is the mean brightness $B_{cr}$ of an image.

After the mean brightness $B_{cr}$ is computed, in operation S225 a clipping rate CR is set. The clipping rate CR may be set according to the mean brightness $B_{cr}$. The clipping rate CR is a ratio of a clipped area to an entire area of the brightness histogram "pdf". For example, when the clipping rate CR is set to 20%, 20% of the brightness histogram "pdf" is clipped. The clipping rate CR ranges from 0 to 100%. When the clipping rate CR increases a slope of the cumulative histogram "cdf" is increasingly linear, approximating an original image. In other words, the degree of image correction is low. On the contrary, when the clipping rate CR decreases, contrast is increasingly enhanced. In other words, the degree of image correction is high.

Equation (4) illustrates an example in which the clipping rate CR is set according to the mean brightness $B_{cr}$. In other words, the clipping rate CR can be obtained using Equation (4);

$$CR = 100 - B_{cr} \times 0.4.  \quad (4)$$

When the clipping rate CR is controlled based on the mean brightness $B_{CR}$ of an image, the degree of image correction adaptively changes according to the brightness of the image. As a result, image contrast can be enhanced more effectivety. Alternatively, the clipping rate CR may be set to a fixed value, it may be set using other methods or equations, or it may be set by a user. In other words, the clipping rate CR may be set in various different ways.

After the clipping rate CR is set, in operation S230 a clipped histogram is computed. To compute the clipped histogram, a clipping threshold $T_{cr}$ is first determined based on the clipping rate CR. The clipping threshold $T_{cr}$ is a value by which frequencies exceeding it are clipped. When the clipping threshold $T_{cr}$ is controlled, an image enhancement rates that is, the degree of image correction can be controlled when the clipping rate CR is set, the clipping threshold $T_{cr}$ is determined based on the clipping rate CR. Thus, when the clipping threshold $T_{cr}$ is determined, the clipping rate CR is also determined.

When the clipping threshold $T_{cr}$ is determined, the brightness histogram is reconstructed according to Equation (5). In other words, a clipped brightness histogram $p\tilde{d}f$, which may be referred to as a clipped histogram, is obtained using Equation (5):

$$p\tilde{d}f[k] = \begin{cases} pdf[k] & \text{if } pdf[k] < T_{cr} \\ T_{cr} & \text{if } pdf[k] > T_{cr} \end{cases} \quad (5)$$

Figure 4B:
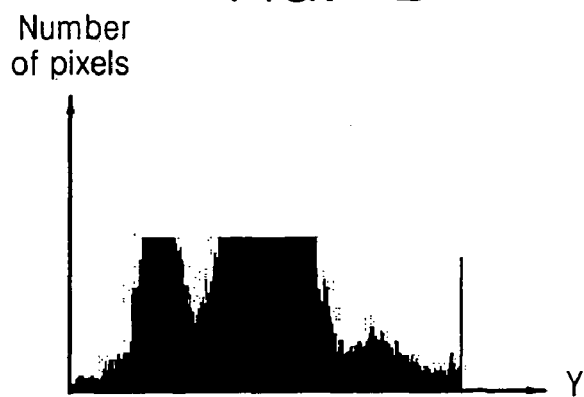

As is seen from Equation (5), frequencies(number of pixels) exceeding the clipping threshold $T_{cr}$ in the original brightness histogram "pdf" are clipped to the clipping threshold $T_{cr}$ and frequencies lower than the clipping threshold $T_{cr}$ remain as they are, An example of the clipped histogram is illustrated in FIG. 4B. As illustrated in FIG. 4B, frequencies, that is, the number of pixels, exceeding the clipping threshold $T_{cr}$ are clipped.

After the clipped histogram is obtained, in operation S235 a global gain and a local gain are determined. They are determined based on the clipping rate CR. In other words, a ratio of a clipped portion to the original brightness histogram is used as the global gain and the local gain to correct image contrast. Accordingly, it is preferable that the sum of the global gain and the local gain is the same as the clipping rate CR.

A first region, that is, a black level region, and a second region, that is, a white level region, may be determined in the clipped histogram, so that contrast correction in the black level region and the white level region is different from that over the entire region. Accordingly, the local gain may be divided into a first local gain, which is a gain for the first region, and a second local gain, which is a gain for the second region. The sum of the first local gain and the second local gain may be the same as the local gain.

The high and low local gains may be calculated using Equation (6):

Local_Gain_Low=(Total_Gain−Global_Gain)/2

Local_Gain_High=(Total_Gain−Global_Gain)/2 (6)

where Total_Gain, Global_Gain, Local_Gain_Low, and Local_Gain_High denote a total gain, a global gain, a first local gain, and a second local gain, respectively.

The Total_Gain is a clipping rate. In other words, a ratio of a clipped portion to an original brightness histogram is set as the total gain and the total gain is distributed as the global gain, the first local gain, and the second local gain. The global gain is uniformly distributed throughout the clipped histogram. The local gain is distributed to a particular region of the clipped histogram. The global gain may be controlled in a range of 0-100%. For example, when the global gain is 100%, the local gain is 0%. In this case, a uniform gain is used over the entire region without the control of the local gain, which corresponds to typical clipped histogram equalization (CHE).

When Equation (6) is used, the first gain is the same as the second gain. For example, when the clipping rate is 20%, the upper 20% of the original histogram is clipped and becomes a total gain of 20 which is distributed as a local gain and a global gain. When the global gain is determined to be 50%, it has a value of 10. When the first and second local gains are determined using Equation (6), each of them has a value of 5. Here, the first local gain and the second local gain have the same value, however, they may also have different values.

Figure 3B:
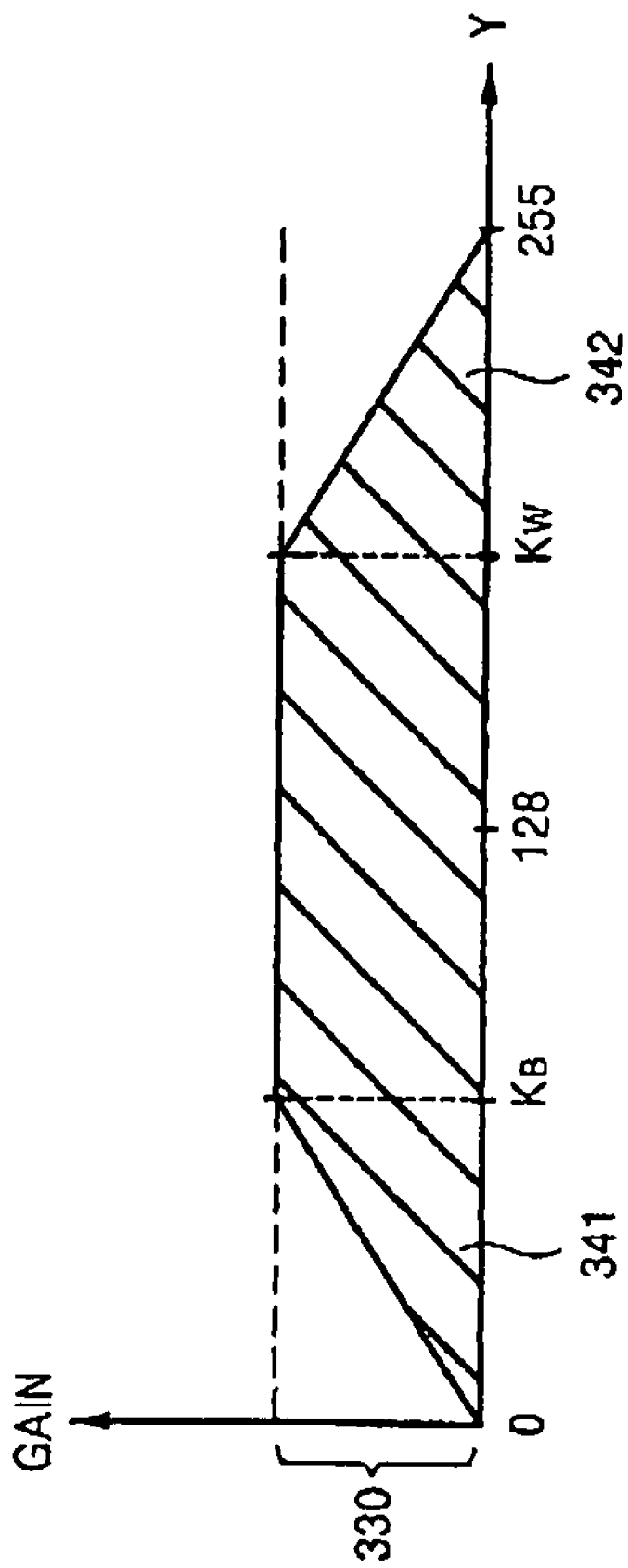

FIGS. 3A and 3B illustrate a global gain and a local gain in an exemplary embodiment of the present invention. Referring to FIG. 3A, a global gain 310 is uniformly distributed throughout the clipped histogram. A first local gain 321 and a second local gain 322 are distributed to only predetermined regions, respectively. According to the gain graph illustrated in FIG. 3A, a gain is distributed in inverse proportion to a brightness from 0 to $k_B$, is uniformly distributed regardless of a brightness of $k_B$ to $k_W$, and is distributed in proportion to a brightness from $k_W$ to 255.

Referring to FIG. 3B, a first local gain 341 and a second local gain 342 are distributed to only predetermined regions, respectively. However, unlike the gain graph illustrated in FIG. 3A, the gain is distributed in proportion to the brightness from 0 to $k_B$, is uniformly distributed regardless of the brightness from $k_B$ to $k_W$, and is distributed in inverse proportion to the brightness from $k_W$ to 255.

After the global gain and the local gain are determined, the clipped histogram is corrected using the global gain in operation S240 and is then corrected using the local gain in operation S245.

In operation S240, the clipped histogram is corrected by adding a value obtained by dividing the global gain by the total number of gray levels to the clipped histogram $p\tilde{d}f$. This correction may be expressed by Equation (7):

$$C_G = p\tilde{d}f + \frac{\text{Global\_Gain}}{K}, \quad (7)$$

where K is the total number of gray levels, for example, 256, and $C_G$ is a histogram corrected using the global gain (global-corrected histogram).

Thereafter, black level correction using the first local gain may be accomplished using Equation (8):

$$C_B = \begin{cases} p\tilde{d}f, & \text{if } k \geq k_B \\ p\tilde{d}f + \frac{2\text{Local\_Gain\_Low}}{k_B^2} \times k, & \text{otherwise} \end{cases}, \quad (8)$$

where $C_B$ is a black-level corrected histogram and $k_B$ is brightness, that is, a gray level, defining a black level region, that is, brightness having a value lower than $k_B$ belongs to the black level region. According to Equation (8), the histogram remains as it is in a region having a brightness of $k_B$ or higher and is corrected to be brighter or darker in a region having a brightness lower than $k_B$.

White level correction using the second local gain may be accomplished using Equation (9):

$$C_W = \begin{cases} p\tilde{d}f, & \text{if } k \geq k_W \\ p\tilde{d}f + \frac{2\text{Local\_Gain\_High}}{k_W^2} \times k, & \text{otherwise} \end{cases} \quad (9)$$

where $C_W$ is a white-level corrected histogram and $k_W$ is brightness, that is, a gray level, defining a white level region, that is, a brightness, having a value equal to or higher than $k_W$ belongs to the white level region. According to Equation (9), the histogram remains as it is without being corrected in a region having a brightness of $k_W$ or higher and is corrected to be brighter or darker in a region having a brightness lower than $k_W$.

The order of the correction using the global gain (S240) and the correction using the local gain (S245) may be changed, that is, reversed.

Figure 4C:
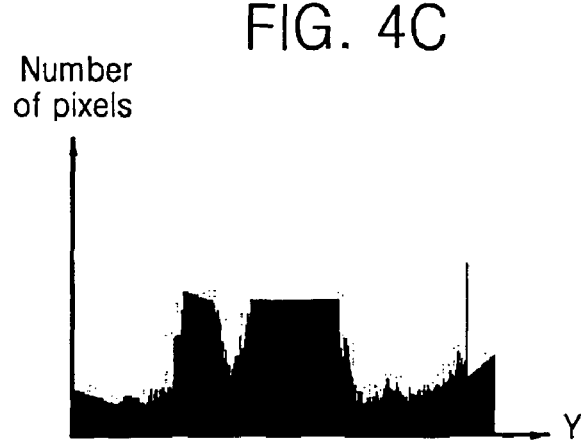

An example of a corrected brightness histogram "pdf", which may be referred to as a corrected histogram, obtained through the correction using the global gain (S240) and the correction using the local gain (S245) is illustrated in FIG. 4C.

After the corrected histogram "pdf" is obtained, in operation S250 a corrected cumulative histogram "cdf" is computed using the corrected histogram. The corrected cumulative histogram "cdf" may be obtained by substituting the histogram "pdf" with the corrected histogram "pdf" in Equation (2).

In operation S255, the corrected cumulative histogram "cdf" is used as a transformation function to correct the input image. In other words, the contrast of the input image is enhanced by matching the input image with the corrected cumulative histogram "cdf" using Equation (10):

$$y(i,j) = C \times cdf'[f(i,j)], \quad (10)$$

where C is a predetermined constant, and y(i,j) and f(i,j) denote an output brightness and an input brightness, respectively, of each pixel.

According to the above-described exemplary embodiment of the present invention, an input value is not output as it is with respect to a black level region and a white level region but is processed considering brightness, thereby obtaining an image with enhanced contrast and suppressed noise.

As described above, according to the exemplary embodiment of the present invention, a clipping rate is adaptively controlled according to the distribution of brightness in an input image using CHE which is a histogram processing technique, so that a contrast enhancement rate is controlled, and a clipped gain is appropriately distributed to a black level region and a white level region in the clipped histogram. As a result, an optimal image desired by a user can be obtained.

Figure 5:
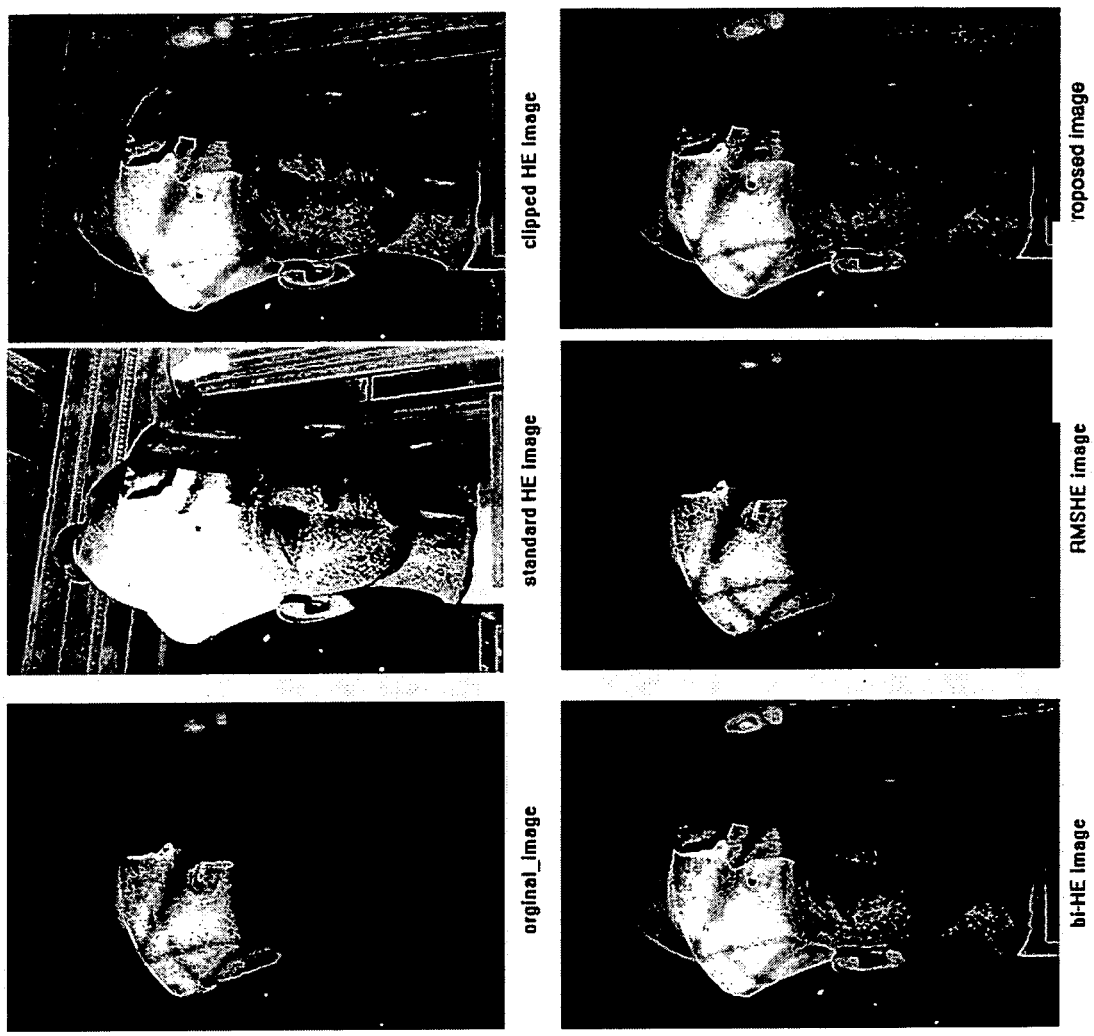
FIGS. 5 through 7 illustrate original images, images corrected using conventional technology, and images corrected using an exemplary embodiment of the present invention.
Figure 6:
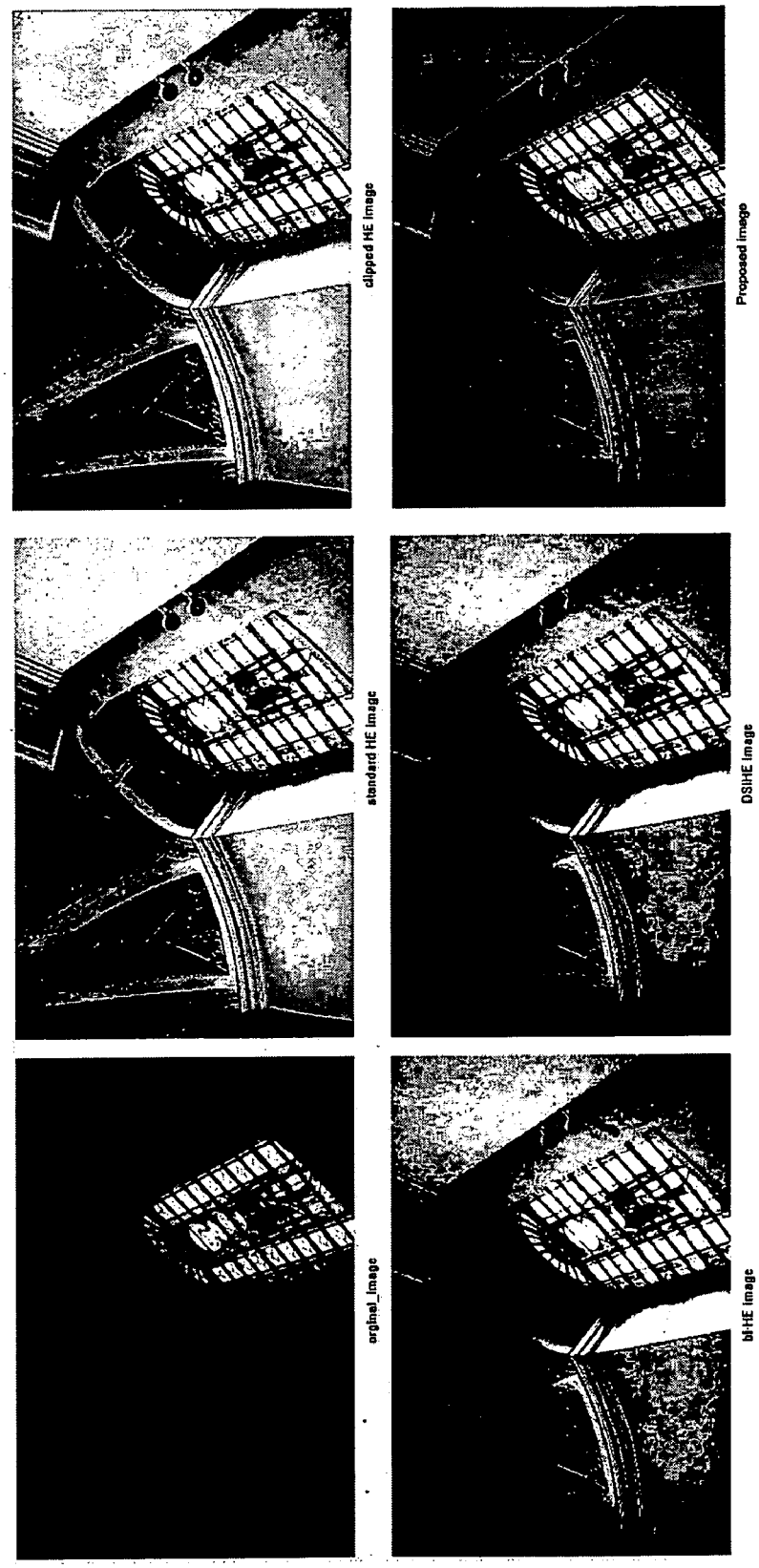
Figure 7:
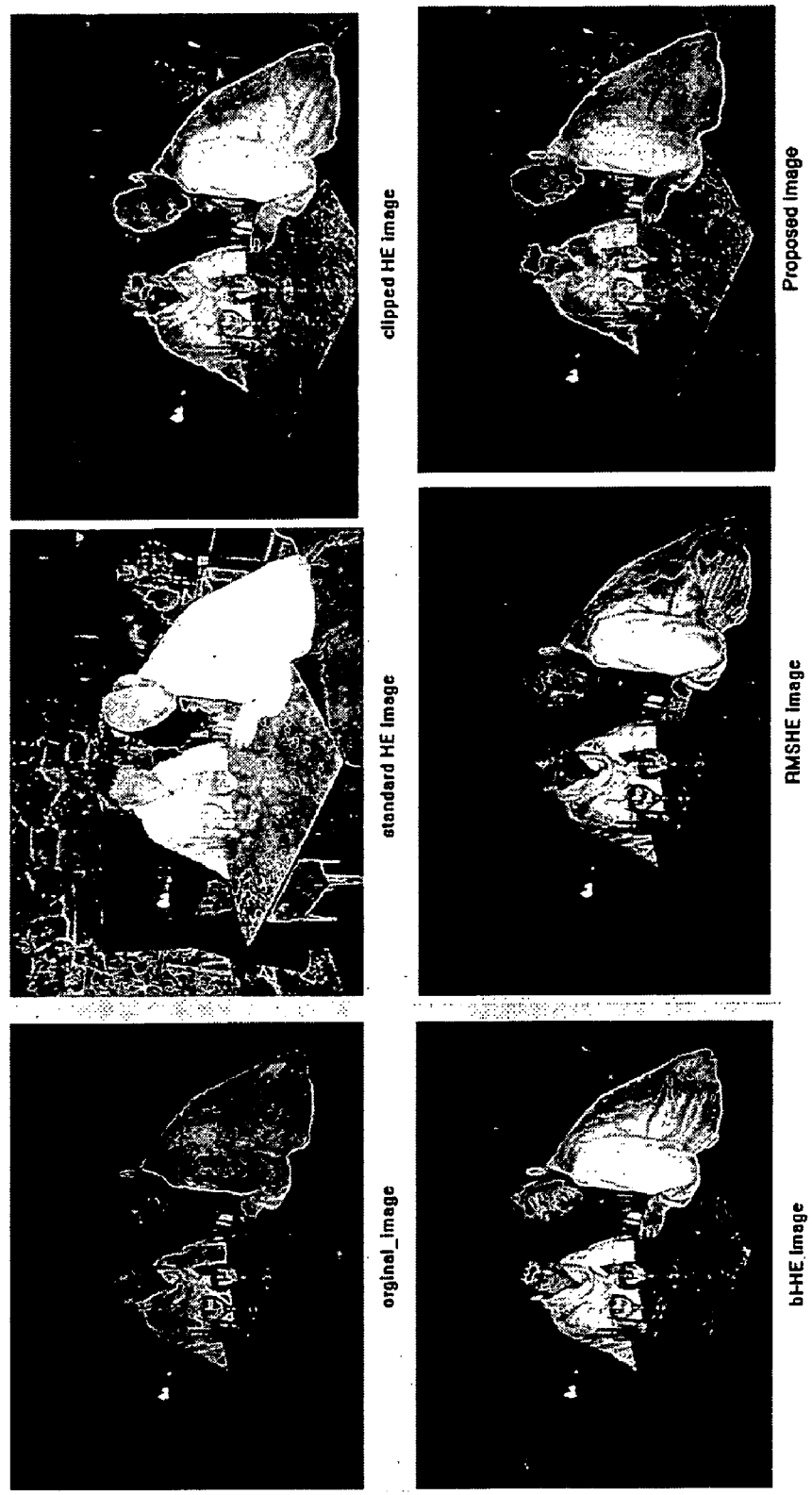

FIGS. 5 through 7 illustrate original images, images corrected using conventional technology, and images corrected using an exemplary embodiment of the present invention. In FIGS. 5 through 7, "original_image" indicates an original image; "standard HE image" indicates an image corrected using standard histogram equalization (SHE) "clipped HE image" indicates an image corrected using CHE; "bi-HE image" is an image corrected using bi-histogram equalization (BHE); "RMSHE image" indicates an image corrected using recursive mean-separate histogram equalization (RMSHE); and "proposed image" indicates an image corrected using an exemplary embodiment of the present invention. As is inferred from FIGS. 5 through 7, images corrected using the exemplary embodiment of the present invention have more enhanced contrast and higher sharpness than images corrected using the conventional technology.

As described above, according to exemplary embodiments of the present invention, image contrast defining clearness of the outline of an object is enhanced, thereby increasing the sharpness of an image display. In addition, a user is allowed to appropriately control a contrast rate and a gain, thereby obtaining optimal desired images. Moreover, since the exemplary embodiment of the present invention requires a relatively small amount of computation contrast can be enhanced in real time.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. An image processing method comprising:
    obtaining a brightness histogram;
    computing a mean brightness of an input image;
    determining a clipping rate based on the computed mean brightness;
    determining a clipping threshold based on the determined clipping rate;
    obtaining a clipped brightness histogram by clipping frequencies exceeding the determined clipping threshold in the obtained brightness histogram;
    obtaining a corrected brightness histogram b correcting the clipped brightness histogram using the clipping rate as a total gain;
    obtaining a cumulative histogram from the corrected brightness histogram; and
    correcting the input image using the cumulative histogram as a transformation function, wherein the step of obtaining the corrected brightness histogram comprises:
    determining a global gain and a local gain based on the total gain; and
    obtaining the corrected brightness histogram using the global gain and the local gain,
    wherein the global gain is uniformly distributed throughout the clipped histogram, and the local gain is distributed to a particular region of the clipped histogram, and
    wherein a sum of the global gain and the local gain is the same as the clipping rate;
    wherein the step of determining the global gain and the local gain comprises determining a first local gain for a first region and a second local gain for a second region based on the determined local gain;
    wherein the step of obtaining the corrected brightness histogram using the global gain and the local. gain comprises:
    determining the first region and the second region in the clipped brightness histogram;
    correcting the first region of the clipped brightness histogram using the first local gain; and
    correcting the second region of the clipped brightness histogram using the second local gain;
    wherein the step of determining the first local gain and the second local gain is performed using:

Local _Gain _Low=(Total _Gain-Global _Gain)/2

Local _Gain _High=(Total _Gain-Global _Gain)/2 where Total_Gain, Global_Gain, Local_Gain_Low, and Local_Gain_High denote the total gain, the global gain, the first local gain, and the second local gain, respectively.

2. An image processing method comprising:
obtaining a brightness histogram;
computing a mean brightness of an input stage;
determining a clipping rate based on the computed mean brightness;
determining a clipping threshold based on the determined clipping rate;
obtaining a clipped brightness histogram by clipping frequencies exceeding the determined clipping threshold in the obtained brightness histogram;
obtaining a corrected brightness histogram by correcting the clipped brightness histogram using the clipping rate as a total gain;
obtaining a cumulative histogram from the corrected brightness histogram; and
correcting the input image using the cumulative histogram as a transformation function,
wherein the step of obtaining the corrected brightness histogram comprises:
determining a global gain and a local gain based on the total gain; and
obtaining the corrected brightness histogram using the global gain and the local gain,
wherein the step of determining the global gain and the local gain comprises determining a first local gain for a first region and a second local gain for a second region based on the determined local gain,
wherein the step of obtaining the corrected brightness histogram using the global gain and the local gain comprises:
determining the first region and the second region in the clipped brightness histogram;
correcting the first region of the clipped brightness histogram using the first local gain; and
correcting the second region of the clipped brightness histogram using the second local gain, correcting the second region of the clipped brightness histogram, using the second local gain, and
wherein the step of correcting of the first region comprises correcting the clipped brightness histogram using:

$$C_B = \begin{cases} p\tilde{d}f, & \text{if } k \geq k_B \\ p\tilde{d}f + \frac{2\text{Local\_Gain\_Low}}{k_B^2} \times k, & \text{otherwise} \end{cases},$$

where $C_B$ is the histogram corrected using the first local gain, $k_B$ is brightness defining the first region, and Local_Gain_Low is the first local gain.

3. An image processing method comprising:
obtaining a brightness histogram;
computing a mean brightness of an input stage;
determining a clipping rate based on the computed mean brightness;
determining a clipping threshold based on the determined clipping rate;
obtaining a clipped brightness histogram by clipping frequencies exceeding the determined clipping threshold in the obtained brightness histogram;
obtaining a corrected brightness histogram by correcting the clipped brightness histogram using the clipping rate as a total gain;
obtaining a cumulative histogram from the corrected brightness histogram; and
correcting the input image using the cumulative histogram as a transformation function,
wherein the step of obtaining the corrected brightness histogram comprises:
determining a global gain and a local gain based on the total gain; and
obtaining the corrected brightness histogram using the global gain and the local gain,
wherein the step of determining the global gain and the local gain comprises determining a first local gain for a first region and a second local gain for a second region based on the determined local gain,
wherein the step of obtaining the corrected brightness histogram using the global gain and the local gain comprises:
determining the first region and the second region in the clipped brightness histogram;
correcting the first region of the clipped brightness histogram using the first local gain; and
correcting the second region of the clipped brightness histogram using the second local gain, correcting the second region of the clipped brightness histogram, using the second local gain, and
wherein the step of correcting the second region comprises correcting the clipped brightness histogram using:

$$C_W = \begin{cases} p\tilde{d}f, & \text{if } k \geq k_W \\ p\tilde{d}f + \frac{2\text{Local\_Gain\_High}}{k_W^2} \times k, & \text{otherwise} \end{cases},$$

where $C_w$ is the histogram corrected using the second local gain, $k_w$ is brightness defining the second region, and Local_Gain High is the second local gain.

4. An image processing method comprising:
obtaining an original brightness histogram of an input image;
determining a clipping rate and a clipping threshold with resect to the obtained original brightness histogram;
obtaining a clipped brightness histogram by clipping frequencies exceeding the determined clipping threshold in the obtained original brightness histogram;
determining a global gain and a local gain based on the determined clipping rate;
obtaining a corrected brightness histogram by correcting the clipped brightness histogram using the determined global gain and the local gain; and
correcting the in ut image based on the obtained corrected brightness histogram,
wherein the global gain is uniformly distributed throughout the clipped histogram, and the local gain is distributed to a particular region of the clipped histogram,
wherein a sum of the global gain and the local gain is the same as the clipping rate;
wherein the step of determining the global gain and the local gain comprises dividing the local gain into a first local gain for a first region and a second local gain for a second region,
wherein the first local gain and the second local gain is determined using:

Local_Gain _Low=(Total_Gain-Global_Gain)/2

Local_Gain _High=(Total _Gain-Global_Gain)/2 where Total_Gain, Global_Gain, Local_Gain_Low, and local_Gain_High denote the total gain, the global gain, the first local gain, and the second local gain, respectively.

5. The image processing method of claim 4, wherein the step of determining the clipping rate and the clipping threshold comprises determining one of the clipping rate and the clipping threshold according to a determined mean brightness of the input image.

6. The image processing method of claim 4, wherein the step of determining the clipping rate and the clipping threshold comprises determining one of the clipping rate and the clipping threshold based on a value input by a user.

7. The image processing method of claim 4, wherein a sum of the global gain, the first local gain, and the second local gain is the same as the clipping rate.

8. An imaging system comprising:
an input image receiver; and
a processor correcting the input image and outputting a corrected image,
wherein the processor obtains an original brightness histogram of the input image, determines a clipping rate and a clipping threshold with respect to the original brightness histogram, obtains a clipped brightness histogram by clipping frequencies exceeding the clipping threshold in the obtained original brightness histogram, determines a global gain and a local gain based on the determined clipping rate, obtains a corrected brightness histogram by correcting the obtained clipped brightness histogram using the determined global gain and the determined local gain, and corrects the input image based on the obtained corrected brightness histogram,
wherein the global gain is uniformly distributed throughout the clipped histogram, and the local gain is distributed to a particular region of the clipped histogram,
wherein a sum of the global gain and the local gain is the same as the clipping rate;
wherein the input image receiver comprises at least one among a camera, an image communication s stern, a camera .hone and a medical instrument,
wherein the local gain is divided into a first local gain for a first region and a second local gain for a second region,
wherein the first local gain and the second local gain is determined using:

Local _Gain _Low=(Total _Gain-Global _Gain)/2

Local _Gain _High=(Total _Gain-Global _Gain)/2 where Total_Gain, Global_Gain, Local_Gain_Low, and Local_Gain_High denote the total gain, the global gain, the first local gain and the second local gain, respectively.

* * * * *